United States Patent [19]

Mohan

[11] Patent Number: 5,333,303
[45] Date of Patent: Jul. 26, 1994

[54] METHOD FOR PROVIDING DATA AVAILABILITY IN A TRANSACTION-ORIENTED SYSTEM DURING RESTART AFTER A FAILURE

[75] Inventor: Chandrasekaran Mohan, San Jose, Calif.

[73] Assignee: International Business Machines Corporation, Armonk, N.Y.

[21] Appl. No.: 678,526

[22] Filed: Mar. 28, 1991

[51] Int. Cl.$^5$ .............................................. G06F 11/14
[52] U.S. Cl. ................................ 395/575; 364/285.2; 364/DIG. 1; 371/12
[58] Field of Search ........................ 395/575; 371/12; 364/DIG. 1

[56] References Cited

U.S. PATENT DOCUMENTS

| | | | |
|---|---|---|---|
| 4,716,528 | 12/1987 | Crus et al. | 364/300 |
| 4,945,474 | 7/1990 | Elliott et al. | 364/200 |

OTHER PUBLICATIONS

Ng, P., "A Commit Protocol for Checkpointing Transactions", IEEE CH2612-0, 1988, pp. 22-31.
Daudenard, et al., "Implementation of a File System with a Fast and Selective Recovery", IBM TDB, Feb. 1987, pp. 3837-3838.
Abstract of Japanese Patent Application 84 JP-276025, 59-276025, Dec. 25, 1985.
Abstract of Japanese Patent Application 87 JP-026307, 62-26307, Feb. 9, 1987.
Abstract of Japanese Patent Application 87 JP-227105, 62-227105, Sep. 10, 1987.
Date, An Introduction to Database Systems, Addison-Wesley, 1986, pp. 413-436.
Korth, Database System Concepts, McGraw-Hill, 1986, pp. 325-353.
Agrawal, et al., "Recovery Architectures for Multiprocessor Database Machines", ACMO-89791-16-0-1/85/005/0131, pp. 131-145.
Mohan, "ARIES: A Transaction Recovery Method Supporting Fine-Granularity Locking and Partial Rollbacks Using Write-Ahead Logging", IBM Research Report RJ 6649, Jan. 23, 1990.
Mohan, "Commit-LSN: A Novel and Simple Method for Reducing Locking and Latching in Transaction Processing Systems", Proceedings 16th VLDB Conference, Aug. 1990, pp. 1-13.
Mohan, et al., "Transaction Management in the R* Distributed Database Management System", ACM Transactions on Database Systems, vol. 11, No. 4, Dec. 1986, pp. 378-396.
Borr, "Robustness to Crash in a Distributed Database: A Non-Shared Memory Multi-Process or Approach", Proceedings 10th International Conference on Very Large Databases, Aug. 1984, pp. 445-452.
Copeland, et al., "The Case for Safe RAM", Proceedings 15th International Conference on Very Large Databases, Aug. 1989, pp. 327-334.
IMS/VS Extended Recovery Facility: General Information IBM Publication GG24-3150-0, Mar., 1987.
IMS/VS Extended Recovery Facility: Technical Reference, IBM Publication GG24-3153-0, Apr., 1987.
CICS/MVS Version 2.1.2 XRF Guide, IBM Publication No. SC33-0522-02, Mar., 1991.

(List continued on next page.)

Primary Examiner—Stephen M. Baker
Attorney, Agent, or Firm—Baker, Maxcham, Jester & Meador

[57] ABSTRACT

Enhanced data availability occurs in a write-ahead logging, transaction-oriented database system by permitting new transactions to acquire access to data while restart recovery operations are proceeding. The invention permits new transactions to acquire access to data during restart recovery UNDO processing on the condition that the last update to the data occurred before a commit point measured by the beginning of the earliest-commencing transaction with uncommitted updates which was still executing when a system failure initiated restart recovery operations. During REDO processing, a transaction is permitted access to data which, in addition to meeting the commit point condition, is not in a data structure subject to the REDO processing.

6 Claims, 4 Drawing Sheets

U.S. PATENT DOCUMENTS

CICS/MVS Extended Recovery Facility Performance, IBM Publication GG66-0281-00, Jul., 1988.

Levy, "Incremental Restart", IEEE Publication Reprint No. CH2968-6/0000/0640, 1991, pp. 640-648.

Stonebraker, "The Design of Post Gres Storage System", Proceedings of the 13th VLDB Conference, Sep., 1987, pp. 289-300.

Mohan, "ARIES/KLV: A Key-Value Locking Method for Concurrency Control of Multiaction Transactions Operating of B-Tree Indexes", Proceedings of the 16th VLDB Conference, Aug., 1990, pp. 1-14.

Mohan et al., Efficient Commit Protocols for the Tree of Processes Model of Distributed Transactions, IBM Research Report RJ3881, Jun. 12, 1983.

Teng, et al., "Managing IBM Database 2 Buffers to Maximize Performance", IBM Systems Journal, vol. 23, No. 2, 1984, pp. 211-218.

Mohan, et al., ARIES/IM: An Efficient and High Concurrency Index Management Method Using Write-Ahead Logging, IBM Research Report RJ6846, Aug. 29, 1989.

Mohan, et al., A Case Study of Problems in Migrating to Distributed Computing: Data Base Recovery Using Multiple Logs in the Shared Disks Environment, IBM Research Report RJ7343, May 3, 1990.

Rothermal, et al., "ARIES/NT: A Recovery Method Based on Write-Ahead Logging for Nested Transactions", Proceedings of the 15th International Conference on Very Large Data Bases, Aug., 1989, pp. 337-346.

Mohan, ARIES/LHS: A Concurrency Control and Recovery Method Using Write-Ahead Logging for Linear Hashing with Separations, IBM Research Report, Jun. 1990.

Lehman, A Recovery Algorithm for a High-Performance Memory-Resident Database System, IBM Research Report RJ5707, Jun. 18, 1987.

Rahm, "Recovery Concepts for Data Sharing Systems", IEEE Reprint No. CH2985-0/91/0000/0368, 1991, pp. 368-375.

Rahm, Recovery Concepts for Data Sharing Systems, University Kaiserslautern Technical Report, Oct., 1989.

METHOD FOR PROVIDING DATA AVAILABILITY IN A TRANSACTION-ORIENTED SYSTEM DURING RESTART AFTER A FAILURE

CROSS-REFERENCE TO RELATED APPLICATION

This patent application concerns material which is related to pending U.S. patent application Ser. No. 07/406,186, which was filed Sep. 7, 1989, for "METHOD FOR MANAGING SUBPAGE CONCURRENCY CONTROL AND PARTIAL TRANSACTION ROLLBACK IN A TRANSACTION-ORIENTED SYSTEM OF THE WRITE-AHEAD LOGGING TYPE", and pending U.S. patent application Ser. No. 07/480,700, which was filed on Feb. 15, 1990, for "TRANSACTION PROCESSING SYSTEM AND METHOD WITH REDUCED LOCKING", both assigned to the assignee of this application, and both incorporated herein by reference.

TECHNICAL FIELD

This invention concerns a method for providing access to data in a database management system (DBMS) when the system is being restarted after a failure. A transaction-oriented database system of the write-ahead logging type which includes a restart mechanism for returning the system to a transaction consistent state following a failure is particularly relevant to this invention.

BACKGROUND OF THE INVENTION

Exemplary references which frame the background of this invention are:
1. C. J. Date, "AN INTRODUCTION TO DATABASE SYSTEMS", Vol. 1, Fourth Edition, Addison Wesley Publishing Company, Copyright 1986, Chapter 18.
2. H. F. Korth, et al, "DATABASE SYSTEM CONCEPTS" McGraw-Hill Book Company, Copyright 1986, Chapter 10.
3. C. Mohan, et al, "ARIES: A TRANSACTION RECOVERY METHOD SUPPORTING FINE-GRANULARITY LOCKING AND PARTIAL ROLLBACKS USING WRITE-AHEAD LOGGING" IBM Research Report RJ 6649 (63960), Jan. 23, 1989, Revised Nov. 2, 1990.
4. C. Mohan, "COMMIT_LSN: A NOVEL AND SIMPLE METHOD FOR REDUCING LOCKING AND LATCHING IN TRANSACTION PROCESSING SYSTEM", Proceedings of the Sixteenth VLDB Conference, August, 1990.
5. C. Mohan, et al, "TRANSACTION MANAGEMENT IN THE R* DISTRIBUTED DATABASE MANAGEMENT SYSTEM", ACM Transactions on Database Systems, Vol. 11, No. 4, December, 1986, pgs. 378-396.

These references cover two-phase, commit-type, transaction-oriented database systems which utilize write-ahead logging to register commitment of updates to database data structures. The Date and Korth references document the inherent features of a recovery mechanism which utilizes a log to reset data resources to a state at which a transaction-based system can resume operation following a failure. The first-cited Mohan reference concerns the use of a log to record the operation of a transaction which updates data objects. The log contains in chronological sequence records of committed updating actions taken by a transaction. In this reference, Mohan critically observed that the assignment of a unique log sequence number (LSN) to every log record such that the LSNs are assigned in ascending sequence provides a powerful and efficient basis for recovery, concurrency control, and buffer management in a database system. In the second-cited Mohan reference, a $COMMIT_{13}$ LSN is posited to determine if a data object (such as a page) contains committed updates. Relatedly, each page has recorded on it the LSN of the last update made to it. Equating the $COMMIT_{13}$ LSN to the LSN of the first log record of the oldest update transaction still in progress permits a system to infer that all updates in pages with $page_{13}$ LSN less than $COMMIT_{13}$ LSN have been committed. The last-cited Mohan et al reference is relevant to the state of the art.

In transaction processing, the property of atomicity guarantees that if a transaction executes some updates against a recoverable data resource, and a failure occurs before the transaction reaches its normal termination or an interim point of consistency ("commits"), then those updates will be undone. As Date teaches, atomicity is provided by COMMIT and ABORT operations. The COMMIT operation signifies that a transaction has completed and that all of its updates must be permanently entered into the database. The ABORT operation signifies the unnatural termination of a transaction caused by the occurrence of a fault; it signifies inconsistency of the database and implies that all updates made by the unsuccessfully-completed transaction must be undone ("rolled back").

In the incorporated patent application and in the first-cited Mohan reference, a system failure which interrupts transaction processing initiates operation of a restart recovery mechanism (a "Mohan-type" restart recovery mechanism) including REDO and UNDO components. The REDO component tracks back in the system log from the point of failure to obtain log records whose updates had not been entered into the database, by the time of the failure. Those log records that were written by committed transactions are used to permanently enter those updates into the record. The UNDO component utilizes the log records to track back from the point of failure all transactions which were unnaturally terminated by the failure and rolls those transactions back.

Relatedly, transactions with uncommitted updates which are terminated by a system failure are referred to as "in flight" transactions.

The Mohan-type restart recovery mechanism also processes transactions which have had updates committed but which have not naturally ended at the point of failure. These transactions are referred to as "in doubt" transactions and are either redone or undone according to conditions which exist at the time of recovery.

Various solutions have been proposed to provide improved data availability during restart recovery. One of the solutions is system redundancy in which the failure of one system initiates the operation of a redundant standby system. This solution is exemplified, for example, in the XRF (extended recovery facility) of the IMS product available from the assignee. Another solution uses parallel non-volatile memory. See, for example, R. Agrawal et al, "RECOVERY ARCHITECTURES FOR MULTIPROCESSOR DATABASE MACHINES", ACM Reprint 0-89791-160-1/85/005/0131, Copyright 1985. All of these solutions are relatively expensive.

There is, therefore, an evident need for a cost-effective technique which makes data available during restart recovery processing in a database management system. This need is particularly critical in view of the possibility that recovery may entail undoing very long transactions by a single process in which all read I/Os are performed synchronously, one page at a time. The desired solution should be one which supports beneficial features of a DBMS such as fine-granularity locking with semantically-rich lock modes and operation logging, partial rollbacks, write-ahead logging, as well as steal and no-force buffer management policies. A force buffer management policy states that before a transaction is allowed to commit, all data structures modified by the transition must be forced to non-volatile storage. The steal policy states that a page with uncommitted updates may be written to non-volatile storage.

SUMMARY OF THE INVENTION

Accordingly, it is an object of this invention to devise a method for assuring data availability during restart recovery and transaction rollback in a database management environment which utilizes write-ahead operation logging and the steal and no-force buffer management policy. It is a related object to devise a method which reduces the standby time of restart recovery during which initiation of transactions is delayed pending an assurance that data used by the transactions will be consistent.

The foregoing objects are satisfied by a method in which transaction processing is permitted to start as soon as a DBMS is brought up after failure, instead of waiting for all of the DBMS recovery to be completed. The peril in permitting new transaction activity to occur even before restart recovery is completed stems from the fact that some of the data structures that the new transactions want to access might be in undesirable states which will leave data inconsistencies if access is permitted. Two of the undesirable states are:

1. Under the no-force policy, transaction updates are recorded in a log, but updated pages are not necessarily written to non-volatile storage when a transaction's commit point is reached. Thus, a failure may occur after updates are recorded on the log but before they are made in non-volatile storage. Thus, a page on disk at restart may not contain some updates for which log records exist. These updates might be ones that were performed by uncommitted and/or committed transactions. Permitting access to such a page might lead to a new transaction reading an older version of a piece of data for which one or more log records written by one or more committed transactions remain to be applied during the REDO phase of restart recovery. Assuming record locking is used with flexible storage management, even if the new transaction were to access the page for updating or inserting some record for which no unapplied log records exists, permitting that operation to complete might result in some space on the page being consumed which results in a state in which it is impossible to redo some of the unapplied changes relating to other records on the same page for which log records exist. Since the REDO phase is page-oriented and not performed logically across pages, the REDO phase must be completed for these pages before new transactions are permitted access to them.

2. A page on disk may contain all the updates logged for that page. However, permitting access to such a page could cause inconsistencies if the page contains updates of in-flight transactions which are to be rolled back during the UNDO phase of restart. The page may also contain updates of in-doubt transactions whose commit or abort outcome will remain doubtful at the end of restart and for which locks will be reacquired during the course of the REDO phase to protect their uncommitted updates. Allowing access during these conditions might result in a new transaction reading some uncommitted data even though the new transaction will be acquiring locks.

The invention is a method which permits new transactions to gain access to data resources during restart recovery, while avoiding the two situations just described. The invention permits access during both the REDO and UNDO phases of restart recovery. The method of the invention employs two mechanisms. First, every page written to non-volatile storage has a first field for entry of the log sequence number for the most recent update to the page. This number is referred to as the "page$_{13}$ LSN". Whenever a new transaction requests access to a page in non-volatile storage during restart recovery, the page_LSN of the requested page is compared with an LSN representing the oldest update of the earliest-commencing in-flight transaction. Any page with a page$_{13}$ LSN having a value less than this "low-water" LSN can safely be accessed because its last update was made by a transaction which had completed prior to the beginning of the oldest in-flight transaction.

The second mechanism is provided as a data bit in a second information field in every page in non-volatile storage. This bit is called the "unlocked$_{13}$ uncommitted$_{13}$ data$_{13}$ bit" (UUD$_{13}$ Bit). If the bit is set to a first state (preferably '0') then the page does not contain any updates not protected by locks. In particular, if a new transaction is given access to the page under the first mechanism, updates the page and returns it than the value of the "senior" LSN. However, the conditioning of the UUD$_{13}$ Bit to '0' indicates that all uncommitted updates are protected by locks. The page can be accessed by a new transaction under the guarantee that the locks will protect any uncommitted updates which may be removed during restart recovery.

During restart recovery after a failure, the method of the invention:
uses restart recovery to add to pages the results of logged transaction updates which are missing in the database pages and to rollback uncommitted transactions which were executing at the time of the failure for which no log commit or in-doubt records exist; and concurrently with operation of the restart recovery, provides for transaction processing data structures whose contents were not changed after the beginning of the earliest-starting uncommitted transaction.

A method which provides data structures for transaction processing in a database system including a restart recovery mechanism:
assigns a log sequence number (LSN) to each log record which denotes the log record's position in a log sequence;
enters into each data structure staged into a non-volatile storage an LSN denoting the last update made to the data structure;

operates the recovery restart mechanism in response to a failure in the system; and during operation of the restart recovery mechanism:
  commences a transaction and issues a request from the transaction for a data structure in the non-volatile storage;
  compares the LSN in the data structure with a COMMIT$_{13}$ LSN, the COMMIT$_{13}$ LSN being the minimum of LSNs denoting begin transaction log records of all in-flight transactions at the time of failure; and
  if the LSN in the data structure is less than the COMMIT LSN, provides the data structure to the transaction, otherwise:
  suspends the transaction until restart recovery is completed.

Preferably, the method of providing data structures for transaction processing operates the recovery restart mechanism by performing REDO processing before UNDO processing, the method providing the data structure to a new transaction during the REDO phase only if the LSN in the data structure is less than the COMMIT$_{13}$ LSN and the data structure is not one which will be redone during the REDO pass.

DETAILED DESCRIPTION OF THE PREFERRED EMBODIMENT

Figure 1:
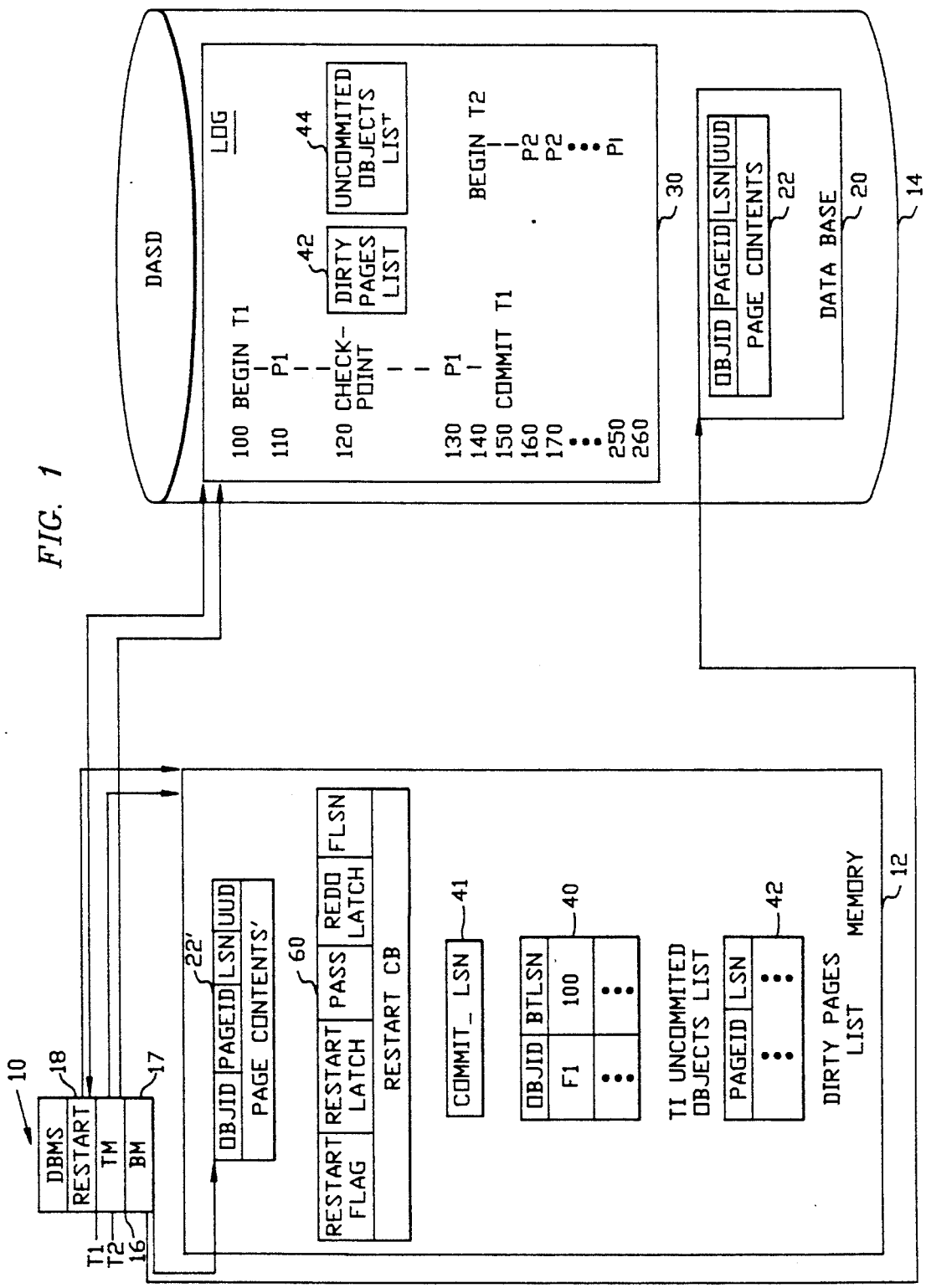
FIG. 1 depicts a database management system with a main memory, a non-volatile storage for staging data structures to and from the main memory for transaction processing, and a transaction log. The DBMS includes a Mohan-like restart recovery mechanism.

Refer to FIG. 1 where a representative database management system (DBMS) 10 is coupled to a main memory 12 and to a non-volatile storage subsystem 14. Preferably, the non-volatile storage 14 is a direct access storage device (DASD) such as a disk. Such storage is also called stable storage because it remains intact and its contents are available in the face of failures characterized by Korth as logical errors, system errors, or system crashes. The DBMS 10 is conventional and can include almost any transaction-based system such as the SQL/DS, or DB2 systems available from the assignee. (DB2 is a trademark of the assignee.) The DBMS 10 includes, among other components, a transaction manager TM 16 and a buffer manager BM 17. The DBMS 10 further includes a Mohan-type restart recovery mechanism 18 with REDO and UNDO components as described in the cross-referenced U.S. patent application Ser. No. 07/406,186 and in the referenced IBM Research Report.

The non-volatile storage 14 stores data structures which are accessed through the DBMS by transactions, two of which are indicated by T1 and T2. Preferably, the data structures are contained in a database 20 in the DASD 14 and comprise pages such as page 22. A transaction requests, through the TM 16, access to a page for transaction processing. The request is passed to the BM 17 which operates a buffer pool in the memory 12 into which pages are staged from the database 20 for access by executing transactions. A copy 22' of the page 22 is shown in FIG. 1 residing in the memory 12.

The transaction manager 16 maintains a write-ahead log 30 in the storage subsystem 14. The log 30 is conventional in all respects. In this regard, the transaction manager of the DBMS 10 ensures that, for any transaction which alters a page, the sequence of actions causing the alteration is recorded. As an example, log records for two transactions, T1 and T2, are recorded in the log. The log records for each transaction are entered into the log in a sequence, with each record being assigned a log sequence number corresponding to its place in the sequence. The log sequence numbers (LSNs) are assigned in a monotonicly increasing sequence. As Mohan points out in the IBM Research Report, LSNs are usually logical addresses of corresponding log records but can also comprise version numbers or timestamps.

The sequence of log records for transaction T1 shows when the transaction began with a BEGIN T1 log record at LSN 100, an update to page P1 at LSN 110, another update to P1 at LSN 130, and a commit record at LSN 150. Transaction T2 is described in a record sequence beginning at LSN 140 and showing updates at LSNs 160, 170, and 250.

As is typical in a transaction-based system, a checkpoint is periodically taken of the status of transactions. The checkpoint information is entered in the log and assigned the LSN for its place in the sequence. In the usual case, the checkpoint log record will include information about the contents of all the updated database buffers in the main memory 12. Two components of a checkpoint log record of particular interest in this invention are an uncommitted object list (UOL 44 and a dirty page list 42, both obtained from status information maintained by the transaction manager 16 and buffer manager 17 during transaction processing. The TM 16 maintains, for active transactions, a list of objects that have the transaction's uncommitted updates. For example, list 40 is maintained for transaction T1. At checkpoint time, the TM 16 obtains the union of all uncommitted lists, and the combined list is referred to in the checkpoint log record as the uncommitted objects list. The BM 17 also maintains a dirty page list 42. In this regard, a "dirty page" is a page staged into the memory 12 from the non-volatile storage 14 and modified, but not as yet written back to the storage 14. During normal processing, when a page is staged from the storage 14 into the memory 12 and is subsequently modified, the identification of the page is entered into the list 42 together with the current end-of-log address (dirty LSN-DLSN) which will be the address of some log record to be written in the future. The value of DLSN indicates from what point in the log there may be updates which are, possibly, not yet in the non-volatile storage version of the page. Whenever pages are staged back to the non-volatile storage 14, the corresponding entries in the dirty page list are removed. If later the page is dirtied again, then the page will be re-entered into the dirty pages list.

Thus, assume that the transaction T1 requests access to a record on page 22 and that the page is not in storage. The request is forwarded by the TM 16 to the BM 17, which stages the page in the non-volatile storage 14 into the main memory 12. The structure of the page includes at least four identification and status fields and the contents of the page. The first field contains the identification of the object (OBJID) to which the page belongs. Such an object can be, for example, a file or a folder. A second field contains the identification of the page (PAGE ID). A third field contains the LSN of the log record recording the last update made to the page prior to the page being staged into the non-volatile storage 14. The UUD (unlocked$_{13}$ uncommitted$_{13}$ data$_{13}$ bit) field is used to indicate whether, after restart recovery commences, the page contains uncommitted updates which are not protected by locks.

When the page 22 is staged from the non-volatile storage 14 into the memory 12 and is about to be modified, a corresponding entry is made into the dirty page list. Assume that the page 22 corresponds to the page P1 identified in the log records for transaction T1 and that its contents have been updated from "page contents" to "page contents". The updated page is identified by reference numeral 22' in the memory 12. Assume that the updates corresponding to LSNs 110 and 130 are made to the page. When the first of these updates is made, the corresponding entry is made by the transaction manager into T1's uncommitted list. The entry consists of the OBJID field value of the page and the begin transaction LSN (BTLSN) for T1. Assume that page P1 is a component of file F1; the entry for the page in the list 40 includes F1 in the OBJID field. The LSN for the BEGIN T1 log record is entered into the BTLSN field of the list 40. Later, the updates made to P1 by T1 are committed, as indicated by LSN 150. At this time, the corresponding entry in T1's uncommitted list 40 is removed; however, page P1 remains in the dirty page list until it is returned to the non-volatile storage 14.

Assume now that a failure occurs when the LSN sequence has advanced to 260 and that the last checkpoint is at LSN 120. Assume further that, while the updates made by T1 to P1 have been recorded on the log, the updated version of the P1 has not yet replaced the previous version in the non-volatile storage 14. Further, at the point of failure, T2 is in-flight, having had none of its updates committed.

When failure occurs, the restart recovery mechanism 18 is invoked. This mechanism, using the log records and backward-chained LSNs restarts the DBMS 10 in response to the failure. The mechanism corresponds essentially with that described by Mohan et al in the cited IBM Research Report. As Mohan et al describe it, in an ANALYSIS pass through the log, the mechanism finds the last checkpoint prior to failure and scans from that point to the end of the log to acquire information about dirty pages, and about in-flight, in-doubt, and completed transactions. The dirty pages information provides a starting point from which the REDO PASS of the mechanism 18 re-establishes the state of the database as of the time of the system failure by processing log records for all transaction 81 updates from the REDO starting point up to the point of failure. The REDO pass acquires the necessary locks for protecting uncommitted updates of transactions which were in the in doubt state at the time of the failure. During the UNDO pass, the mechanism 18 rolls back all updates of all in-flight transactions. For transactions which were rolling back when the failure occurred, the UNDO phase of the mechanism 18 rolls back only updates which have not already been undone.

Controlling status information respecting the restart recovery mechanism 18 is found in a restart control block (RESTART CB) 60. In addition to other information, the restart control block 60 includes a RESTART flag which can be tested to see if the restart recovery mechanism is in operation. The RESTART flag is set to 'Y' if restart is still in progress; otherwise, the flag is set 'N'. The control block 60 also includes a RESTART LATCH which the mechanism 18 holds in the X (exclusive) mode whenever the RESTART flag is equal to 'Y'. A third control block field PASS is checked when restart is in progress to see in which phase the mechanism is currently operating. Another latch, the REDO LATCH, is held in the X mode by the mechanism whenever PASS field is set to 'REDO'. This latch is released once the REDO pass is completed. The RESTART LATCH is released only after restart recovery is completed (REDO and UNDO passes). Prior to the beginning of the REDO and UNDO passes, the current end-of-log LSN is determined (the "fail$_{13}$ LSN"), and an FLSN field in the control block is set to that value. In the example, the FLSN would be set to '260' by the restart recovery mechanism 18 by the time the REDO phase is initiated.

THE INVENTION

Following a system failure, the invention permits new transactions to begin execution concurrently with the operation of the restart recovery mechanism 18 by guaranteeing that any data structure requested by a new transaction is not in either of the two undesirable states. Although for discussion the data structures are assumed to be pages, the inventor contemplates that other data structures may be protected by this guarantee.

The invention depends upon the provision by the restart recovery mechanism 18 of a point of reference for determining if a page requested by a new transaction may be provided from the non-volatile storage without the risk that either REDO or UNDO processing will make the required version inconsistent with a redone or undone version of the page in non-volatile storage. This reference is called the COMMIT$_{13}$ LSN. The "global" COMMIT$_{13}$ LSN is the minimum of LSNs of the begin$_{13}$ transaction log records of all transactions which were in-flight at the point of failure. The COMMIT$_{13}$ LSN is computed at the end of the analysis pass by the restart recovery mechanism. Its use in the method of the invention is illustrated in FIG. 2.

NEW TRANSACTIONS DURING THE UNDO PASS

Figure 2:
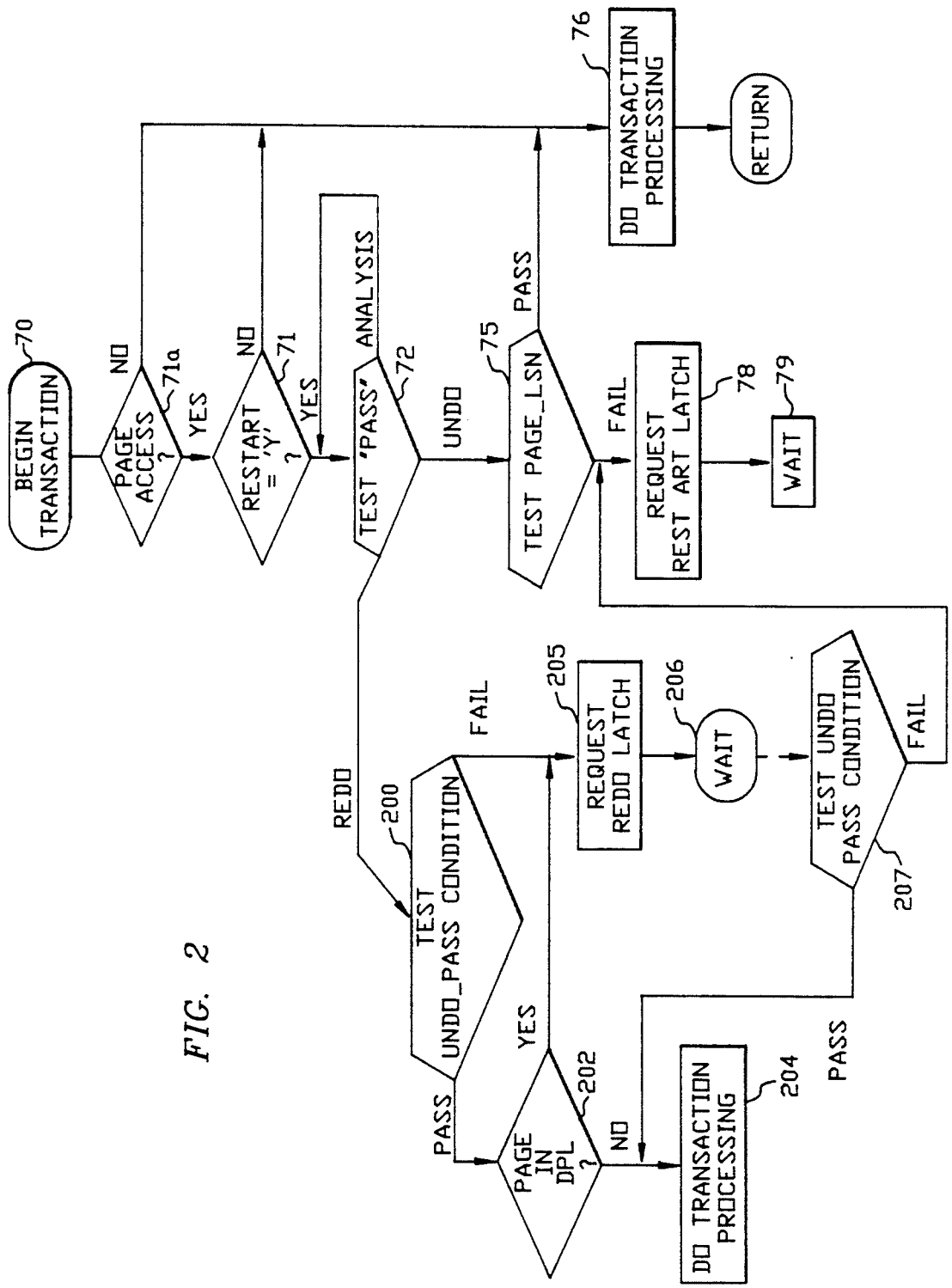
FIG. 2 is a flow diagram illustrating how the method of the invention employs the page$_{13}$ LSN and COMMIT$_{13}$ LSN to provide new transactions with access to data resources during restart recovery operations.

In FIG. 2, a new transaction begins in step 70 and the method of the invention tests, in 70A whether access to a page is required. If not, the transaction continues in step 76. If access is required, the method tests the RESTART flag step 71. If restart recovery is in progress, the positive exit is taken from the decision 71 in the PASS field of the restart control block is tested in step 72. Assume, first, that the REDO phase has completed and that restart recovery is in the UNDO phase. In decision 75, a test of the page-LSN is made.

To this point, the test 75 establishes an UNDO$_{13}$ PASS condition, which is given by:

page$_{13}$ LSN < COMMIT$_{13}$ LSN

The UNDO pass condition is predicated upon retrieval of the requested page from the non-volatile storage 14 so that its page$_{13}$ LSN can be obtained. In conducting the UNDO$_{13}$ PASS test, the first undesirable state is avoided since the REDO pass has been completed. The second undesirable state is avoided because no page will be delivered to a new transaction if that page has an update made after the beginning of the earliest-commenced in-flight transaction subject to the UNDO phase processing. In this case, the PASS exit is taken from decision 75 and the new transaction is permitted to acquire the page for transaction processing in step 76.

If, on the other hand, the UNDO$_{13}$ PASS condition is not met, the requesting transaction next seeks the RESTART latch in the S (shared) mode (step 78), thereby waiting for restart recovery processing to complete. The inventor contemplates that avoidance of deadlocks involving the RESTART latch will require the requesting transaction to surrender any other latches that it holds before waiting on the RESTART latch. For example, the new transaction may have acquired a latch on the page that has been accessed and, in the case of an index access, possibly the latch on the parent of that page. After surrendering its held latches and submitting the S mode request for the RESTART latch, the new transaction will enter the wait state in step 79, awaiting its own restart following the end of restart recovery processing.

Figure 2A:
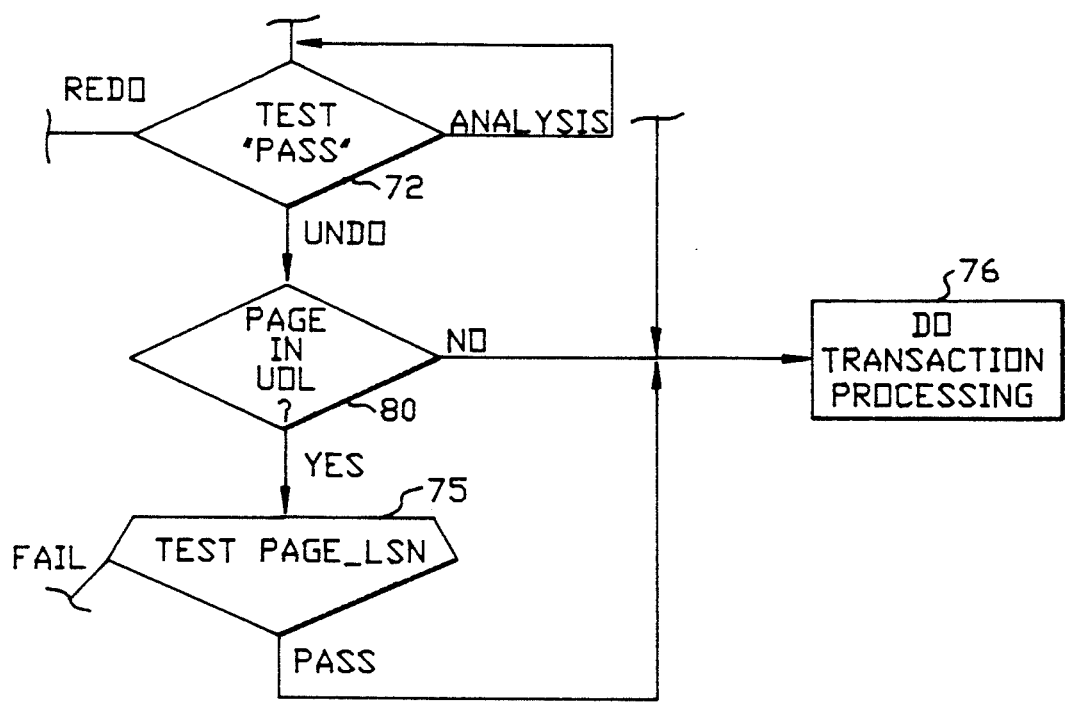
FIG. 2A is a partial flow diagram illustrating the addition of the step of checking an uncommitted objects list in the method of FIG. 2.

Permitting a new transaction to obtain only pages which meet the UNDO$_{13}$ PASS condition may be unnecessarily conservative. FIG. 2A illustrates a more liberal UNDO-PASS condition which will permit even greater availability of data during restart recovery. In FIG. 2A, it is assumed that the DBMS logs at checkpoint time an uncommitted objects list (UOL) such as that indicated by reference numeral 44 in the log 30. UOL 44 is the union of all uncommitted lists existing at the time the checkpoint was taken. The list tabulates all objects (for example, at the gross granularity of file, folder, or table) that have uncommitted updates for transactions which were ongoing at the time of checkpoint. During the analysis pass, UOL 44 is brought up to date as of the FLSN. In fact, although during the REDO pass the UOL 44 must contain even objects for which there are uncommitted updates by only in-doubt transactions, at the end of the REDO pass such objects would be safely removed from the UOL since by then the in-doubt transactions would have reacquired their locks on such objects. Furthermore, as the UNDO pass progresses, the UOL is updated. That is, once all of the in-flight transactions which had, as of the failure of the system, uncommitted updates in a particular object are completely undone, that object is removed from the list.

With reference now to FIG. 2A, assuming that the UOL 44 is available, if the restart flag is set to 'Y' then a new transaction is allowed to access a page for reading or writing only under the modified UNDO$_{13}$ PASS condition illustrated in FIG. 2A. In this regard, once it is determined that the UNDO pass is in progress, the positive exit is taken from decision 73 and the UOL 44 is consulted in step 80 to determine whether the page belongs to an object in the list. If the page does not belong to an object on the list, the negative exit can be taken from the decision 80 and the transaction can safely acquire access to the page. If the page is in the list, the positive exit is taken from the decision 80 and the UNDO test is performed in step 75. From this point, the procedure executes as illustrated in FIG. 2.

FIG. 2A establishes a modified UNDO$_{13}$ PASS condition which is expressed as:

(page belongs to object not in UOL) OR ((page belongs to object in UOL) AND (page$_{13}$ LSN<COMMIT$_{13}$ LSN))

Instead of using the begin transaction LSN for the earliest-commencing in-flight transaction for the COMMIT$_{13}$ LSN in testing the UNDO$_{13}$ PASS condition, a more liberal method would be to compute, for each object in the UOL 44, the object-specific COMMIT$_{13}$ LSN. This LSN is described in the fourth-cited article, describing the COMMIT$_{13}$ LSN. In this invention, the restart recovery mechanism 18 considers, for each object, only those transactions that have uncommitted updates on it and computes the minimum of the begin$_{13}$ transaction LSNs of only those transactions (the "object-specific COMMIT$_{13}$ LSN"). Then, during the UNDO pass, the object-specific COMMIT$_{13}$ LSN is used for that object, instead of the global COMMIT$_{13}$ LSN. The advantage of an object-specific COMMIT$_{13}$ LSN over the global COMMIT$_{13}$ LSN is that in general the former will be greater than the latter (in the worst case, they will be equal) thereby allowing more page accesses to new transactions. The object-specific value reduces the negative impact of long-running transactions accessing private or semi-private data. The object-specific COMMIT$_{13}$ LSNs can also be computed at the end of the ANALYSIS pass prior to the REDO pass. In this case, apart from the in-flight transactions, the calculation must take into account even those transactions that were in the in-doubt state at the time of failure. However, during the UNDO pass, only the in-flight transactions that are being undone as part of the pass need be considered in calculating object-specific COMMIT$_{13}$ LSNs.

UUD$_{13}$ BIT

The inventor has observed that, once a page of an object in the UOL 44 meets the UNDO$_{13}$ PASS condition and receives its first update by a new transaction, its page$_{13}$ LSN will cause it to fail all subsequent occasions of the test. Thereafter, no update or read will be possible on that page until restart recovery is finished or the object is removed from the uncommitted objects list 44, whichever happens first. Without further provision, after the first update, the procedure of FIG. 2 would lose track of the fact that the page does not contain any committed update of the transactions being rolled back in the UNDO pass. This information, however, can be preserved and utilized to permit further access to the page after the first update by the UUD$_{13}$ Bit which is provided on every page of the database. If the bit is '1', the page may contain some uncommitted updates which are not protected by locks. If the bit is '0', the page definitely does not contain any updates which are not protected by locks. Note that in the latter instance, the page may still contain some uncommitted updates; however, these updates will be lock-protected.

Figure 2B:
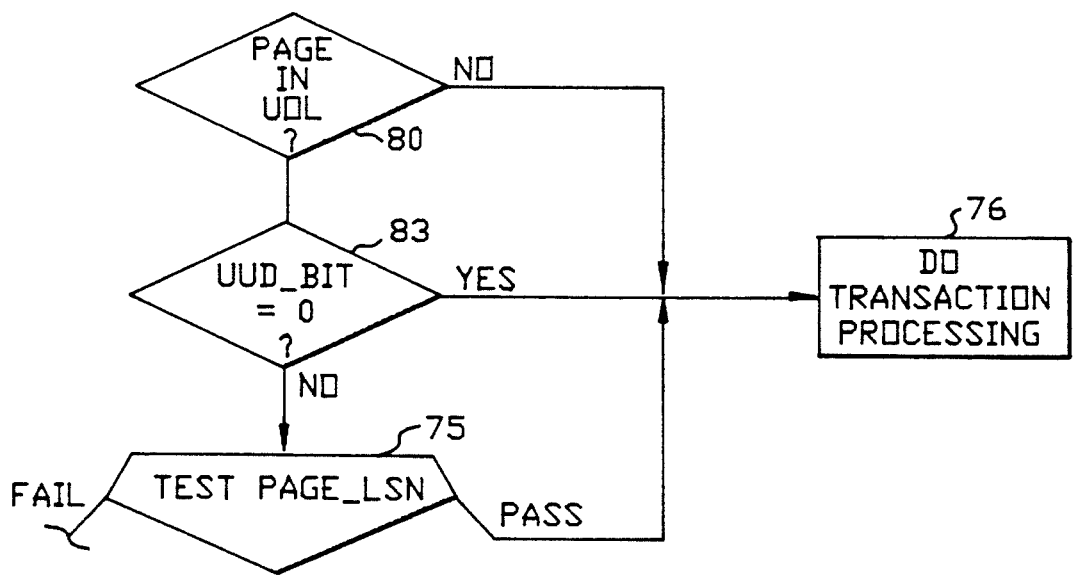
FIG. 2B is a partial flow diagram illustrating the addition of the step of checking a UUD$_{13}$ Bit in the method illustrated in FIG. 2.

Use of the UUD$_{13}$ Bit in the invention is illustrated in FIG. 2B. FIG. 2B illustrates an addition to the UNDO-PASS condition illustrated in FIGS. 2 and 2A. In FIG. 2B, the UNDO$_{13}$ PASS condition to be checked first tests, in decision 80, whether the requested page is in the UOL 44. If not, the UUD$_{13}$ Bit of the page is checked in test have been protected by locks and the page can be provided to the new transaction with the assurance that those updates will be preserved by the locks. The new transaction then is permitted to continue processing in step 76. However, if the bit equals '1', the negative exit from the test is taken and the page$_{13}$ LSN is checked against the COMMIT$_{13}$ LSN (either global or object-specific as provided above). Following this test, the procedure executes according to FIG. 2.

Therefore, the UNDO$_{13}$ PASS condition to be checked according to FIG. 2B becomes:

(page belongs to object not in UOL) OR ((page belongs to object in UOL) AND (UUD$_{13}$ Bit='0')) OR ((page belongs to object in UOL) AND (page$_{13}$ LSN<COMMIT$_{13}$ LSN))

Figure 3:
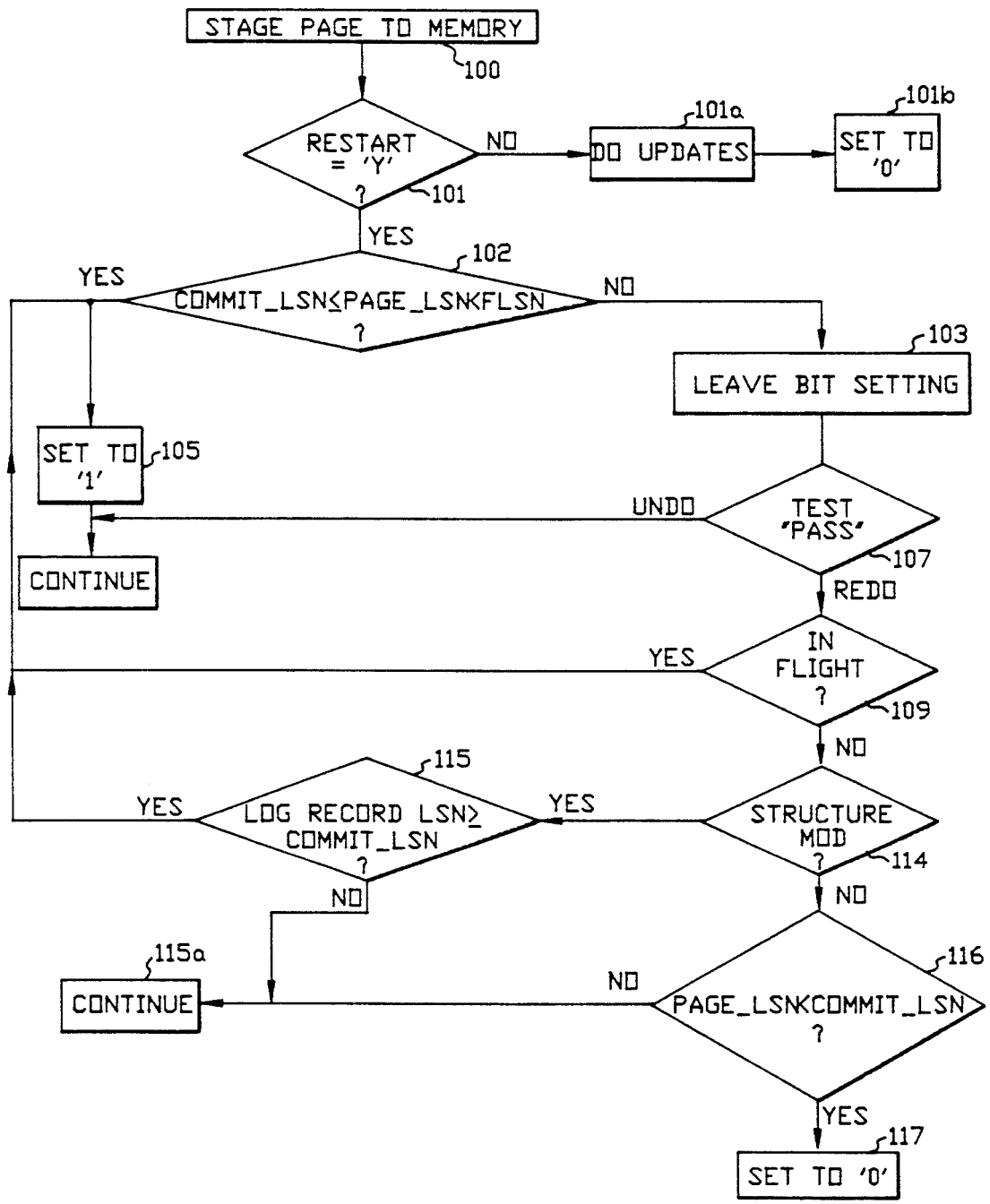
FIG. 3 is a flow diagram illustrating UUD$_{13}$ Bit processing during the REDO and UNDO phases of restart recovery.

FIG. 3 illustrates how the UUD$_{13}$ Bit is conditioned during restart recovery processing according to the invention. Initially, a page must be staged from the non-volatile storage 14 to the memory 12. This step (100) is always performed by the buffer manager, which also performs steps 101 and 102. If, when the page is staged to the memory 12, the RESTART flag is set to 'N', the negative exit is taken from decision 101 and normal transaction processing proceeds in steps 101a and 101b. In this event, normal transaction updates including forward processing and normal UNDO procedures result in setting the UUD$_{13}$ Bit to '0'. Thus, the page is returned to the non-volatile storage with the bit in this state.

If, however, the RESTART flag indicates that restart recovery is in process, the positive exit is taken from decision 101 and the page$_{13}$ LSN is tested in step 102 to see whether it is in the range bracketed between the COMMIT$_{13}$ LSN and FLSN.

If the page$_{13}$ LSN is in the range tested at 102, the positive exit is taken and the buffer manager sets the UUD$_{13}$ Bit to '1'. This is conservative action; the fact that the page is in the range defined in step 102 does not necessarily mean that there is some uncommitted data on the page that is not protected by locks. Since a system failure could happen anytime, the burden is placed on the buffer manager to ensure that the correct setting for the bit is present on the page when the page is staged from the non-volatile storage 14 and restart is still in progress. This is important since, during restart after a failure, it is the non-volatile storage version of the database with which recovery processing and new transactions will be dealing. The buffer manager can apply the test of step 102 using either the global COMMIT$_{13}$ LSN or the object-specific version, but preferably the latter.

It is observed that setting the UUD$_{13}$ Bit by the buffer manager does not cause the page to become dirty. Further, the buffer manager does not disturb the existing setting of the bit on the page if the page$_{13}$ LSN is outside of the range of step 102. If the page$_{13}$ LSN is greater than FLSN, it is incorrect to assume that there is no uncommitted data on the page that is not protected by a lock. This is because this may be the second time that the page is being read from the non-volatile storage during this restart recovery and, when it was read from storage, but before it was subsequently rewritten to the storage (the first time), some in-flight transaction's undo processing might have been performed on the page, causing the page$_{13}$ LSN to become greater than FLSN. Under these conditions, it is essential that the UUD$_{13}$ Bit remain at the value of '1', since the page may still contain some uncommitted updates which are not protected by locks. If, on the other hand, the page$_{13}$ LSN is greater than FLSN because during the first time it was staged into the memory a new transaction had modified it, then it is desirable to retain the UUD$_{13}$ Bit value of '0' that would exist as a result.

If page$_{13}$ LSN is not in the range of step 102, the negative exit is taken, and the current setting of the UUD$_{13}$ Bit is retained in step 103. Subsequently, when the page is accessed for recovery purposes, the following actions are taken. The PASS flag is checked in step 107. Following the REDO exit from this test, if the page is accessed for redoing the update of an in-flight transaction, the positive exit is taken from the decision 109 and the UUD$_{13}$ Bit is set to '1'. This is necessary since the transaction is redoing an update which is not protected by a lock. As of this time, the bit on the page may have a value of '0', and in that case, this update will be the first unprotected one for the page.

If the test in decision 109 indicates that the transaction is not an in-flight one, the test in decision 114 determines whether the update action is for redoing log records for leaf pages in transactions which modify the structures of objects (such as transactions which split or delete pages in a B-tree index) or for redoing record locations in a hash-based storage method for all transactions. In this case, the LSNs of the log records are compared against the COMMIT$_{13}$ LSN in step 115. If the log record's LSN is greater than the value of the COMMIT$_{13}$ LSN, the UUD$_{13}$ Bit for the page is set to '1'. Otherwise, the bit setting currently on the page is unaltered and processing continues in step 115a.

The test of decisions 114 and 115 is necessary because, with the high concurrency supported by index protocols and recovery for hash-based storages, one transaction's uncommitted updates on a certain page may be moved to a totally different page by another transaction. The second transaction may terminate or get into the in-doubt state even though the first transaction may remain in the in-flight state. Under these conditions, after a failure, the only way to ensure that the first transaction's uncommitted updates remain protected is to insist that the mover of the uncommitted data to a different page causes the UUD$_{13}$ Bit to get set to '1' on the second page.

Assuming that a transaction requesting a page is not an in-flight transaction and that a log record does not relate to structure modification, the test in decision 116 is made before a log record's update is redone. In this test, if the LSN for the page is less than the COMMIT$_{13}$ LSN, the page's UUD$_{13}$ Bit is set to '0' in step 117. Here, the method takes advantage of the fact that the page is known to contain only committed updates before this update is redone and the fact that this update itself is either a committed update or an ucommitted update by an in-doubt transaction, which will be protected by locks by the time the UNDO pass starts. Note that after the current log record's update is redone, the page's LSN may become greater than the COMMIT—LSN.

NEW TRANSACTIONS DURING THE REDO PASS

Returning now to FIG. 2, assume that a new transaction begins, that restart recovery is in progress, and that the PASS flag indicates that the REDO phase is being executed. At this point, allowing new transaction activity concurrently with REDO processing also requires that the first undesirable state described above be dealt with. This is done in the invention by taking advantage of information typically logged at the time of the checkpoint in the dirty pages list (DPL), which is indicatead by reference numeral 42 in FIG. 1. The DPL 42 includes only those pages that might potentially be involved in redoing operations. In particular, the DPL 42 may not include any pages on which UNDO may have to be performed, which would be tabulated in the UOL 44. As long as the DPL 42 is available, if the REDO exit is taken from the test 72, a new transaction is allowed to access a page for reading or writing only if the following $REDO_{13}$ PASS condition holds:

($UNDO_{13}$ PASS Condition) AND (page not in DPL)

This condition is tested in steps 200 and 202. Thus, if the $UNDO_{13}$ PASS condition is met and the page is not in the DPL, the process sequence is 200, 202, and 204, permitting the transaction to acquire the page and continue processing. Otherwise, the transaction requests the REDO latch in the S (shared) mode in step 205 and awaits the latch in step 206. When the REDO pass finishes and the transaction acquires the latch, the new transaction must once again check the $UNDO_{13}$ PASS condition and then await the RESTART latch if the condition is not met. Otherwise, transaction processing proceeds.

If, as in some DBMSs, the buffer manager logs at checkpoint time the dirty objects information at a level of granularity above page, the DPL would become a dirty objects list (DOL) which would be substituted for the DPL in the $REDO_{13}$ PASS condition.

Even in those systems which do not log a DPL or equivalent at checkpoint, DPL table could be generated by the restart recovery mechanism by scanning the log from the $REDO_{13}$ LSN to the end of the log. This extra pass can be performed by a process separate from the analysis, REDO and UNDO components. It is initiated when the $REDO_{13}$ PASS is initiated and it uses a dirty objects list to determine what pages of the objects in the dirty objects list might have updates on them which must be redone. This is done by noting the page numbers in the log records relating to objects in the dirty objects list. Since no data page accesses were made, this extra pass would be completed long before the REDO pass completes. As soon as this extra pass is finished, new transactions could be let into the system during REDO. The dirty pages list generated in this fashion will be equal to or will be a superset of the DPL that would have been obtained were the system to log it at checkpoint time and bring it up to date during the ANALYSIS pass as in the Mohan-type restart recovery mechanism.

Since processing new transactions will result in continuous growth of the log beyond the FLSN, the REDO pass must be terminated when the FLSN is encountered.

INDUSTRIAL APPLICABILITY

In addition to single-system DBMS such as are illustrated in FIG. 1, the invention is also applicable in the data sharing environment in which a plurality of nonvolatile storage subsystems are concurrently accessed by one or more transactions. In such a system, all of the storage subsystems containing the database are shared amongst the different DBMSs. Every DBMS may access and modify any portion of the database on the shared disks. Since each DBMS instance has its own buffer pool and because conflicting accesses to the same data may be made from different systems, the interactions amongst the systems must be controlled via various synchronization protocols. This necessitates global locking and protocols for the maintenance of buffer coherency. Such an approach is exemplified in the IMS/VS Data Sharing product available from the assignee of this application.

In the data sharing context, when one system fails, the locks needed to protect the failed system's uncommitted updates may be retained in one or more other systems. In such an event, the still operational systems will continue to be able to access the rest of the data. By using the invention, even as the failed system is recovering, the invention would permit new transaction processing to begin on the same system. Depending on the level of sharing that was in effect at the time of the system failure, the granularity at which the other systems retained the failed system's locks may vary all the way from table level to record level, even if the locking being done by the transactions at the failed system was at the record level. The coarser the granularity at which the locks are retained, the more beneficial the invention becomes.

It should be noted that the locks would be retained by the other systems with the failed system being identified as the owner of those locks rather than by using the identifiers of the individual transactions which caused those locks to be acquired. As a result, the retained logical locks cannot be released until the failed system finishes its UNDO pass and the retained physical locks cannot be released until the failed system finishes its REDO pass. The physical locks are acquired to ensure that at any given time only one system is modifying a given page. That is, the physical locks are used to assure coherency of the data in the different systems buffer pools. Logical locks are used to perform the more traditional concurrency control amongst the different transactions. See the IBM Research Report entitled "RECOVERY AND COHERENCY-CONTROL PROTOCOLS FORMAT INTERSYSTEM PAGE TRANSFER AND FINE-GRANULARITY LOCKING IN A SHARED DISK TRANSITION ENVIRONMENT" March 1991, RJ 8017 by C. Mohan and I. Narang.

If the physical locks are obtained at the page level, the iist of such locks can be used to generate the DPL and the invention can be applied to allow new transaction processing during the REDO pass of the failed system. The DPL will consist of exactly those pages for which physical locks have been retained. Under these conditions, if the logical locks have been retained at the same granularity at which the transactions were acquiring those locks, then the invention can be used by assuming that all the retained logical locks were acquired by a system transaction at the failed system and by treating the $UNDO_{13}$ PASS condition to be true. What this means is that a new transaction will be able to access a page and make progress during the REDO pass if the page is not in the DPL and if the lock needed by the new transaction is not one of the retained locks. If either condition is not true, then the new transaction would wait for the retained locks to be released by the system transaction.

On the other hand, if the logical locks had been retained at a coarser granularity than the granularity at which the transactions were acquiring those locks, the invention can employ the techniques ($COMMIT_{13}$ LSN, UOL, DOL, generating EPL via log analysis, and so on) described earlier for the single system case.

EFFICIENCY OF THE INVENTION

The overhead involved with the invention during normal processing includes the extra check during every page access to see if restart recovery is in progress and the manipulation of the $UUD_{13}$ Bit. These overheads are insignificant.

The extent of the benefit of the invention for executing new transactions during the UNDO pass would depend on the particular mix of transactions normally run by the users of a given DBMS installation. The higher the number and the longer the duration of update transactions, the greater the benefit enjoyed by practice of the invention. Under these circumstances, new transaction processing will start much earlier than in a system without the invention. In fact, the motivation for this invention stemmed from the inventor's realization that some users very regularly produce many tapes worth of log records as a result of the execution of a single transaction. For such users, the invention would be of immense value.

The extent of the benefit conferred by the practice of the invention for executing new transactions during the REDO pass would depend upon the speed at which the buffer manager writes dirty pages to disk. There is a trade-off. The more quickly the buffer manager writes the pages, the less the amount of REDO work to be performed. But then, if there is any locality of reference amongst a set of pages across different transactions, the quick writing of dirty pages would not permit the amoritization of the cost of writing a page to disk across multiple updates to the same page by different transactions or by a single long transaction. Frequent writing of "hot spot" pages would also cause concurrency problems if a page cannot be modified when it is being written to disk. Some DBMS systems delay writing to disk also in order to accumulate multiple dirty pages for a single file so that the capability of the operating system to write multiple pages using a single start I/O command could be exploited to reduce CPU and I/O overheads.

I claim:

1. A method for providing data structures for transaction processing in a database system which includes a database processor, a main memory coupled to the processor, non-volatile storage for storing data structures which are staged to and from the main memory for transaction processing, a write-ahead log having a sequence of log records describing transaction updates made to data structures in the non-volatile storage, and a restart recovery mechanism, the restart mechanism including a REDO component for amending data structures in the non-volatile storage by adding to the structures updates which had not been made in the non-volatile storage by the time a failure affecting the database system occurred, and an UNDO component for rolling back transactions which were incomplete at the time of the failure and for which no log commit or in-doubt records exist in the log (in-flight transactions), the method comprising the steps of:

(a) assigning a log sequence number (LSN) to each log record which denotes the log record's position in the sequence;

(b) entering into each data structure staged into the non-volatile storage from the main memory, an LSN denoting the last update made to the data structure;

(c) operating the restart mechanism in response to a failure in the system;

(d) during step (c):

(1) commencing a transaction and issuing a request from the transaction for a data structure in the non-volatile storage;

(2) comparing the LSN in the data structure with a $COMMIT_{13}$ LSN, the $COMMIT_{13}$ LSN being the minimum of the LSNs denoting begin transaction log records of the in-flight transactions; and (3) if the LSN in the data structure is less than the $COMMIT_{13}$ LSN, providing the data structure to the transaction; otherwise (4) suspending the transaction until step (c) is completed.

2. The method of claim 1, wherein the $COMMIT_{13}$ LSN is the minimum LSN of all log records for updates to a data structure which were uncommitted at the time of the failure.

3. The method of claim 1, wherein the REDO component amends the data structures in the non-volatile storage before the UNDO component rolls back incomplete transactions.

step (c) including providing to the REDO component a list of data structures which have been staged into the main memory from the non-volatile storage and modified, but not yet staged back to the non-volatile storage at the time of the failure; and before the UNDO component rolls back incomplete transactions, step (3) includes providing the data structure to the transaction if the LSN in the data structure is less than the $COMMIT_{13}$ LSN and the data structure is not in the list.

4. The method of claim 1, wherein:

step (c) includes listing all data structures for which uncommitted transaction updates existed at the time of the failure; and step (3) includes providing the data structure to the transaction if the data structure is not listed in step (c) or if the data structure is listed in step (c) and the LSN in the data structure is less than the $COMMIT_{13}$ LSN.

5. The method of claim 4, wherein the database system includes locking means for protecting updates to the data structures, wherein:

step (3) includes providing the data structure to the transaction if:

the data structure is not listed in step (c); or, the data structure is listed in step (c) and all updates to the data structure have been protected; or the data structure is listed in step (c) and the LSN in the data structure is less than the $COMMIT_{13}$ LSN.

6. The method of claims 4 or 5, the $COMMIT_{13}$ LSN being either the minimum of the LSNs denoting begin transaction log records of the in-flight transactions or the minimum LSN of all log records for updates to a data structure which were uncommitted at the time of the failure.

* * * * *

UNITED STATES PATENT AND TRADEMARK OFFICE
CERTIFICATE OF CORRECTION

PATENT : 5,333,303
DATED : JULY 26, 1994
INVENTOR(S) : CHANDRASEKARAN MOHAN

It is certified that error appears in the above-identified patent and that said Letters Patent is hereby corrected as shown below:

Columns 2, lines 8, 12, and 14-15; column 4, lines 24, 29, 36-37 and 43; column 5, lines 7-8, 23, 33, 34, 40, and 42; column 7, line 12-13; column 8, lines 23, 44, 45, 46, 47-48, 64-65 and 67; col. 9 line 3, 4, 13, 30, and 57; column 10, lines 1, 5, 6, 9-10, 12, 14, 19-23, 29, 37, 39, 41, 43, 53, 61, 64, and 66; column 11, lines 4, 5, 8, 11, 13, 15, 26, 31, 33, 34, 36, 48, 50, 53, 54, 63, 64, and 67; column 12, lines 2, 4, 6, 12, 26, 28, 42, and 49 column 13, lines 11, 13 16, 23, 31, 35 and 38; column 14, line 57 and 68; column 15, line 8; and column 16, line 15, 20, 24-25, 40, 50, 60-61, and 62, in each occurrence of "COMMIT$_{13}$LSN"; "page$_{13}$LSN"; "unlocked$_{13}$uncommitted$_{13}$data$_{13}$bit"; "UUD$_{13}$Bit"; "fail$_{13}$LSN"; "UNDO$_{13}$PASS"; or "REDO$_{13}$LSN", "$_{13}$" should be -- _ --.

Signed and Sealed this

Twenty-seventh Day of December, 1994

Attest:

BRUCE LEHMAN

*Attesting Officer*    *Commissioner of Patents and Trademarks*